United States Patent
Shin et al.

(10) Patent No.: US 8,745,647 B1
(45) Date of Patent: Jun. 3, 2014

(54) METHOD AND SYSTEM FOR INTERNET VIDEO AND RICH MEDIA BEHAVIORAL MEASUREMENT

(75) Inventors: Brian J. Shin, Boston, MA (US); Gary C. Griffin, Medford, MA (US); Jason T. Tunney, Ottawa (CA); Trevor B. Rundell, Honeoye Falls, NY (US); Rishi I. Dean, Boston, MA (US); Raymond Yong-Taik Chun, Cambridge, MA (US)

(73) Assignee: Visible Measures Corp., Boston, MA (US)

( * ) Notice: Subject to any disclaimer, the term of this patent is extended or adjusted under 35 U.S.C. 154(b) by 355 days.

(21) Appl. No.: 11/964,479

(22) Filed: Dec. 26, 2007

Related U.S. Application Data

(60) Provisional application No. 60/887,186, filed on Dec. 26, 2006.

(51) Int. Cl.
 *H04H 60/33* (2008.01)
 *H04N 7/10* (2006.01)
 *H04N 7/025* (2006.01)
 *H04N 5/445* (2011.01)
 *G06F 3/00* (2006.01)
 *G06F 13/00* (2006.01)

(52) U.S. Cl.
 USPC ............... 725/9; 725/10; 725/11; 725/14

(58) Field of Classification Search
 None
 See application file for complete search history.

(56) References Cited

U.S. PATENT DOCUMENTS

| | | | |
|---|---|---|---|
| 5,481,294 A * | 1/1996 | Thomas et al. | 725/20 |
| 5,991,802 A | 11/1999 | Allard et al. | |
| 6,470,388 B1 | 10/2002 | Niemi et al. | |
| 6,591,228 B1 | 7/2003 | Hall et al. | |
| 6,901,606 B2 * | 5/2005 | Wright et al. | 725/151 |
| 7,248,777 B2 * | 7/2007 | Feininger et al. | 386/46 |
| 7,689,682 B1 * | 3/2010 | Eldering et al. | 709/223 |
| 2004/0058675 A1 * | 3/2004 | Lu et al. | 455/418 |
| 2004/0186738 A1 * | 9/2004 | Reisman | 705/1 |
| 2005/0125271 A1 | 6/2005 | Peltz | |
| 2005/0138111 A1 | 6/2005 | Aton et al. | |
| 2006/0041902 A1 * | 2/2006 | Zigmond | 725/9 |
| 2006/0075308 A1 | 4/2006 | Haselden et al. | |
| 2007/0016672 A1 | 1/2007 | Wilson et al. | |
| 2007/0214470 A1 * | 9/2007 | Glasgow et al. | 725/10 |
| 2007/0233864 A1 * | 10/2007 | Xie et al. | 709/226 |
| 2007/0260519 A1 * | 11/2007 | Sattley et al. | 705/14 |
| 2008/0066107 A1 * | 3/2008 | Moonka et al. | 725/42 |
| 2008/0187279 A1 * | 8/2008 | Gilley et al. | 386/52 |
| 2008/0261192 A1 * | 10/2008 | Huang et al. | 434/336 |

* cited by examiner

*Primary Examiner* — Nasser Goodarzi
*Assistant Examiner* — Fred Peng
(74) *Attorney, Agent, or Firm* — David H. Judson

(57) ABSTRACT

This disclosure describes methods and systems to quantify and understand the behavior and consumption patterns of audiences with respect to Internet video and rich media applications. In operation, an end user video player or a rich media application (such as an interactive advertisement built with Flash or other method) is instrumented to capture data. The data is collected by a service provider and made available for viewing by customers of a video experience and rich media behavior measurement service.

21 Claims, 12 Drawing Sheets

US 8,745,647 B1

METHOD AND SYSTEM FOR INTERNET VIDEO AND RICH MEDIA BEHAVIORAL MEASUREMENT

This application includes subject matter that is protected by copyright.

This application is based on and claims priority from Ser. No. 60/877,186, filed Dec. 26, 2006.

CROSS-REFERENCE TO RELATED APPLICATION

This application is related to U.S. Ser. No. 11/481,530, filed Jul. 6, 2006, titled "Distributed capture and aggregation of dynamic application usage information."

This application also is related to U.S. Ser. No. 11/774,120, filed Jul. 6, 2007, titled "Remote invocation mechanism for logging."

BACKGROUND OF THE INVENTION

1. Technical Field

The present invention relates generally to Internet video and rich media application audience behavior measurement, consumption, tracking, and reporting.

2. Description of the Related Art

Many destination web sites offer web-based services that host videos for content publishers and that allow audiences to directly consume those video clips either on their websites, or via other sites, blogs, or social networks to which their content is linked and or embedded. To be successful, it is desirable for site owners to understand their audience and their consumption habits so that a site's appeal and stickiness to end users and others (such as potential advertisers) can be tracked, managed, and optimized. Additionally, video and rich media formats are being used more and more for interactive advertising campaigns. Creatives that are provided in such formats need to be measured for audience behavior as well to ascertain the effectiveness of such campaigns.

BRIEF SUMMARY OF THE INVENTION

This disclosure relates to methods and systems to quantify and understand the behavior and consumption patterns of audiences with respect to Internet video and rich media applications. In operation, an end user video player or a rich media application (such as an interactive advertisement built with Flash or other method) is instrumented to capture data. The data is collected by a service provider and made available for viewing by customers of a video experience and rich media behavior measurement service.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

Figure 1:
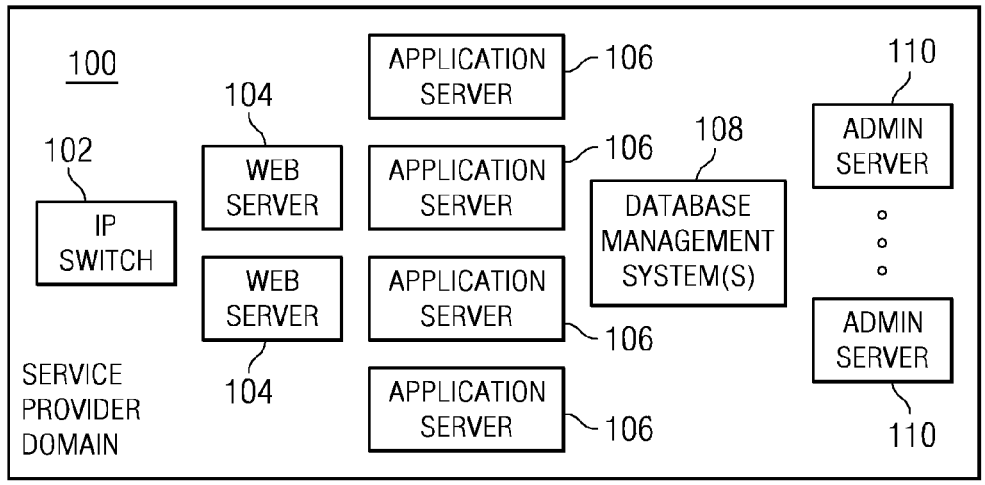
FIG. 1 is a block diagram of a service provider infrastructure that provides analytics as a managed service.

FIG. 1 illustrates a representative service provider or system architecture, which in one embodiment is implemented in or across one or more data centers. A data center typically has connectivity to the Internet. The system provides a web-based hosted solution through which service customers (e.g., advertisers, content publishers, publishing networks, site owners, video owners, and the like) view Internet video and rich media end user experience analytics in an online manner. Participants may interact with the platform as a hosted service. In an alternative embodiment, the system may be implemented over a private network, or as a product (as opposed to a hosted or managed service).

A user of the service (e.g., an advertiser, content publisher, publishing network, site owner, or the like) has an Internet accessible machine such as a workstation or notebook computer. Typically, the user accesses the service provider architecture by opening a web browser on the machine to a URL associated with a service provider domain or sub-domain. The user then authenticates to the managed service in the usual manner, e.g., by entry of a username and password. The connection between the machine and the service provider infrastructure may be encrypted or otherwise secure, e.g., via SSL, or the like. Although connectivity via the publicly-routed Internet is typical, the user may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more administration server machines 110. A representative web server machine 104 comprises commodity hardware (e.g., Intel-based), an operating system such as Linux, and a web server such as Apache 2.x. A representative application server machine 106 comprises commodity hardware, Linux, and an application server. The database management system 108 may be implemented as an Oracle database management package. In a high volume use environment, there may be several web server machines, several application server machines, and a number of administrative server machines. Although not shown in detail, the infrastructure may include a name service, other load balancing appliances, other switches, network attached storage, and the like. The system typically will also include connectivity to external data sources, such as third party databases. Each machine in the system typically comprises sufficient disk and memory, as well as input and output devices. Generally, the web servers 104 handle incoming business entity provisioning requests, and they export a display interface that is described and illustrated in more detail below. The application servers 106 manage the data and facilitate the functions of the platform. The administrator servers 110 handle all back-end accounting and reporting functions. The particular hardware and software implementation details described herein are merely for illustrative purposes are not meant to limit the scope of the present invention.

Figure 2:
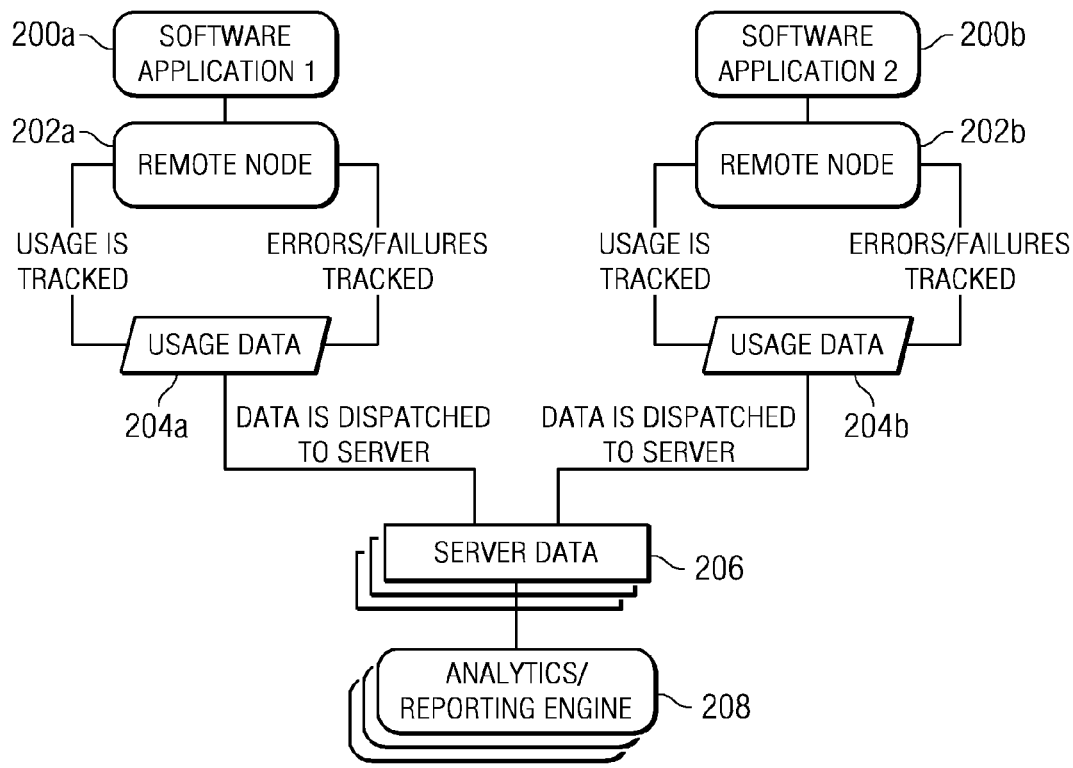
FIG. 2 illustrates the basic service wherein video players are instrumented to provide usage data sets that are then delivered to a remote logging server.

FIG. 2 illustrates a basic operation of an Internet video experience measurement service. In this example, end user video players 200a and 200b have been instrumented with a usage monitoring API. The usage monitoring API is sometimes referred to as a remote node. Thus, video player 200a has associated therewith the remote node 202a and video player 200b has associated therewith the remote node 202b. Of course, the use of two instances is merely illustrative, as the system is designed to provide a highly scalable distributed logging service wherein a large number of instances of the video player or rich media application are instrumented and tracked. In operation, the remote node 202a generates usage data set 204a, and remote node 202b generates usage data set 204b. This usage data is transported to a central server (or to a set of servers), where the data sets are aggregated (reference numeral 206) and processed within an analytics and reporting engine 208.

The subject matter herein provides for an Internet video experience and rich media measuring and tracking service. The following describes a use case for video players. In this example, a service customer adds the usage monitoring API into the video players (or otherwise takes advantage of video players that have been instrumented in this manner). A representative video player is a Flash video player, although the principles of this disclosure are not so limited, as the techniques described herein may be implemented in any type of player. For Flash video players, a monitoring component, preferably packaged as an extension, is installed in the video player (e.g., using the Macromedia Extension Manager). This component is implemented as an ActionScript library that provides application programming interfaces (APIs) for developers to integrate their players with the tracking mechanisms of this disclosure. In one embodiment, developers directly insert relevant stubs into the code to track whichever events they are interested in. Using the monitoring system, events are dispatched, aggregated automatically, processed, and reported. With this approach (the remote node implemented as API calls), developers are afforded control over the events and the level of granularity they wish to track. An instrumented player typically collects data about "system" events and "user" events. System events occur, for example, when a player is loaded, when a video is loaded into the player, when the video begins playing, when the video is paused, when the video finishes scrubbing (i.e., after it is forwarded or rewound), or when the video ends. User events occur, for example, when the user hits the pause button, scrubs the playhead (i.e., move the clip forward or backward), ends the scrub (i.e., stops moving the clip forward or backward), emails the video or clicks a button to get a video's embed code, or the like. In this approach, a set of ActionScript methods are called whenever a system or user event occurs. When an event occurs, API methods typically are combined with one another. A system event and a user event often occur simultaneously and might require two API methods be called at once. A Statistics Collector Timer (SCT) keeps track of a clip's playhead to ensure that accurate metrics are calculated. When a clip is paused, the SCT is paused. When a clip is scrubbed, the SCT is informed of the playhead's new position. The one or more system or user events are heard using ActionScript event listeners. An event listener is a piece of code that listens for a defined event and invokes the API method associated therewith.

In an alternative embodiment, a video player may itself provide hooks (into the player) through a player API so that the video experience measurement service can access, capture and transmit event data to its servers to generate reports. In this embodiment, events (that would be tracked by the API) are now dispatched to the service. The following provides additional details of this alternative embodiment, referred to herein as "auto-detect." As is known, a Flash player has a built-in object class (called NetStream) that handles playback (e.g., play, pause, seek, and the like) of .flv files. An on Status handler can be used to listen to these events. It is also known that a Flash video player uses this class to stream video and communicate with the user interface. Thus, the NetStream class can be used to provide the system with automatic detection (auto-detect) of video events by one or more of the following approaches: (i) modifying the on Status handler to make calls to the remote node (passing the event data); (ii) adding code that forwards on Status events themselves to the remote node; (iii) pass the NetStream object itself to the remote node and let the remote node take control of the on Status handler; (iv) extend the NetStream class to include the remote node. The latter approach provides wrapper code that encapsulates the remote note functionality that overrides any script API that the service customer may otherwise provide (to perform tracking). Any of these methods provides the service with data about the end user's interaction with the video player.

Figure 3:
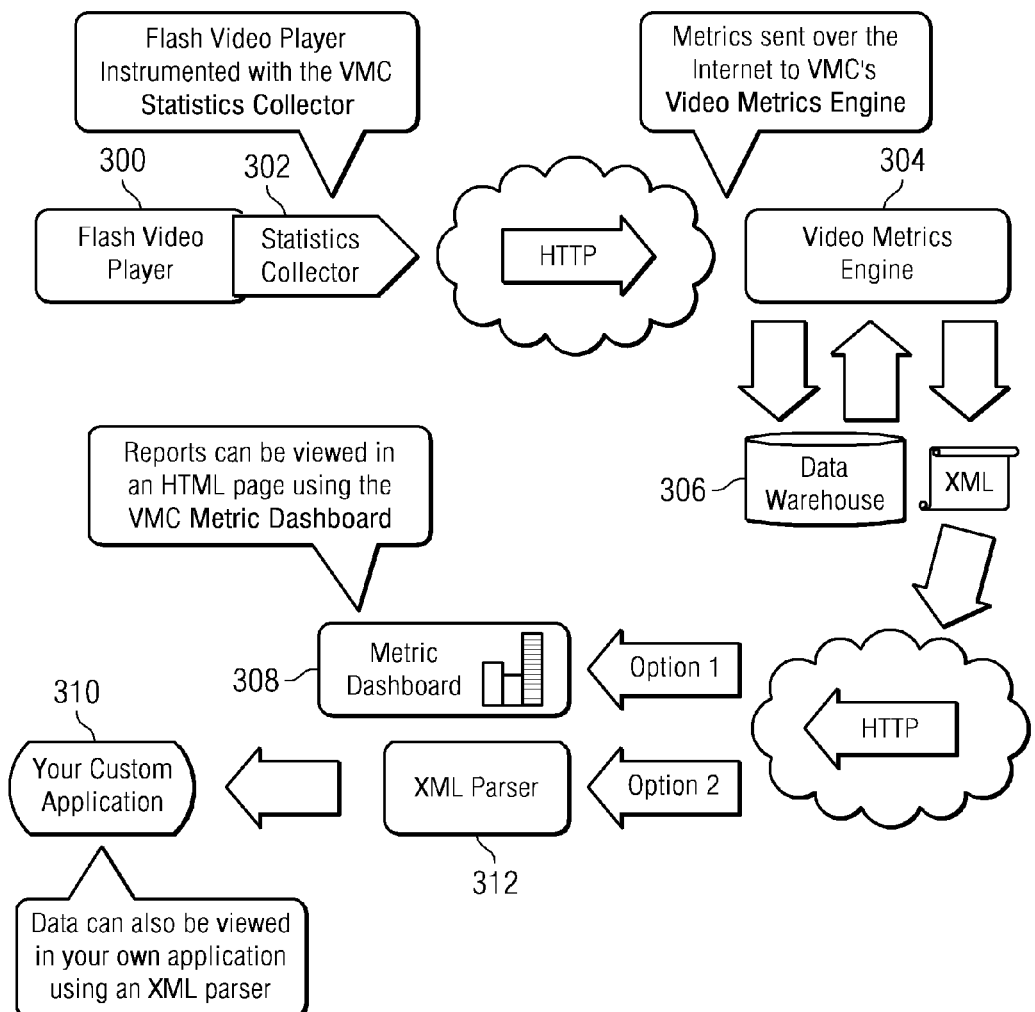
FIG. 3 illustrates a video tracking method according to an embodiment of this disclosure.

FIG. 3 is a simplified illustration of the architecture of the video experience measurement platform. As can be seen, video players or rich media applications 300 are instrumented with data collectors 302, which collect data and forward that data (e.g., over HTTP) to a video metrics engine 304. As noted above, an instrumented player collects data about system events and user events. The video and rich media metrics engine 304 provides the data to a data warehouse 306, which can be accessed using conventional web-access tools, method and protocols. Thus, for example, service customers can view reports in a metric dashboard 308 that is exported from the data warehouse as a web page. A service customer's data may also be retrieved by a customer application 310 through a parser 312. Preferably, data is exported using XML, although this is not a limitation.

Figure 4:
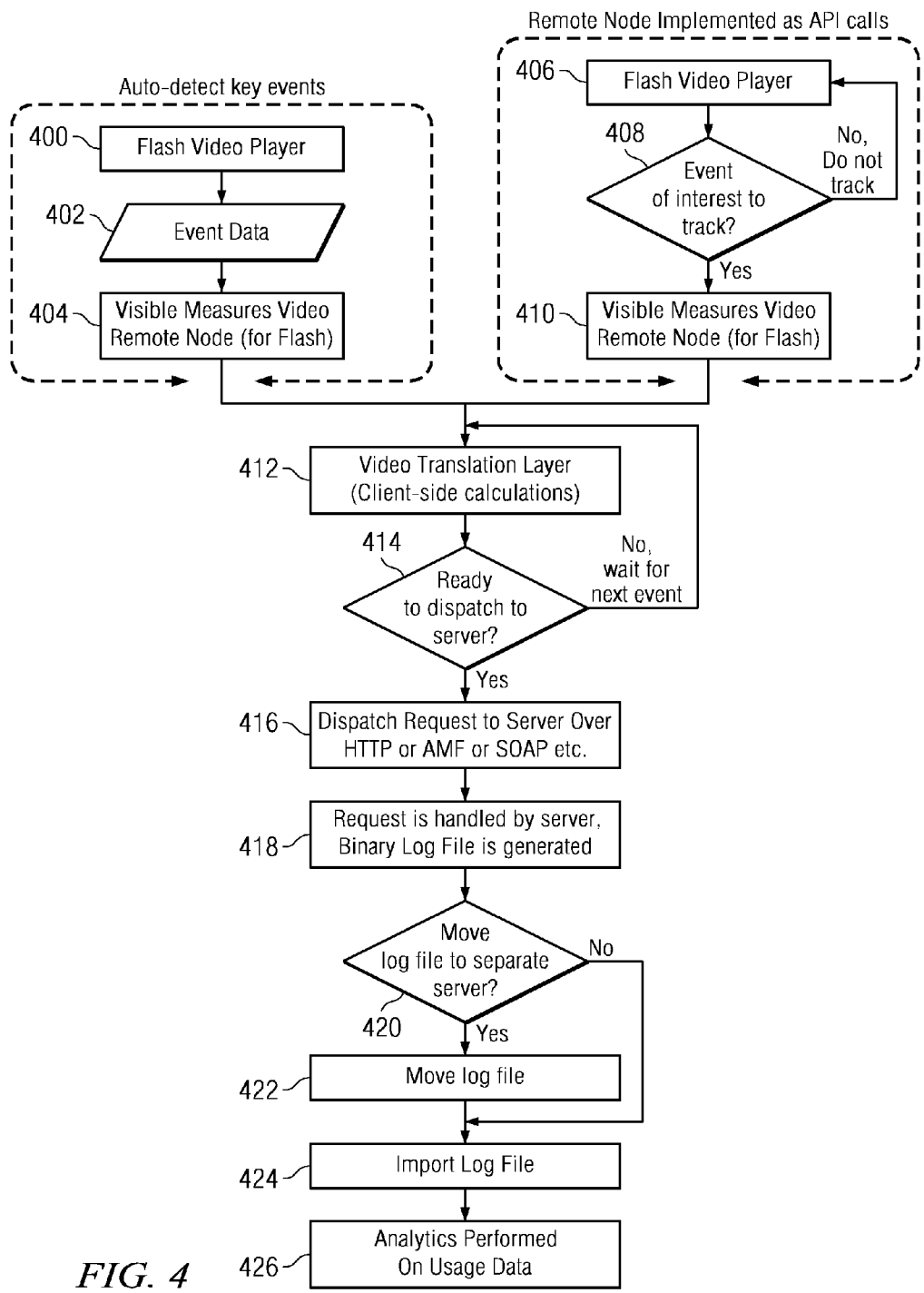
FIG. 4 illustrates a first embodiment of the video tracking method of FIG. 3 in more detail.

FIG. 4 illustrates a video tracking method according to an embodiment of this disclosure. Viewed from the bottom, video players are instrumented to collect data in one of several approaches. Using the above-described auto-detection approach, the video player 400 generates event data 402 that are provided to the remote node 404. In the alternative, the remote node is implemented as a set of API calls from the video player 406. Here, a test 408 is performed to determine whether a particular event is being tracked. If so, the event data is passed to the remote node 410. The data collected by the remote node (404 or 410, as the case may be) is provided to a video translation layer 412 to generate aggregate data. A test is performed at step 414 to determine whether it is time for the data to be dispatched to the server. If not, the routine waits to dispatch. If, however, it is time to dispatch the data, the data is dispatched to the server, e.g., over HTTP, SOAP or some other transport mechanism, at step 416. At step 418, the server generates a binary log file. A determination is made at step 420 regarding whether the log file is to be moved to a separate server. If so, the log file is moved at step 422. If the outcome of the test at step 420 is negative, the binary log file is imported into metrics engine previously described. This is step 424, which is also implemented after step 422. The metrics engine performs analytics on the usage data, as indicated by reference block 426.

Figure 5:
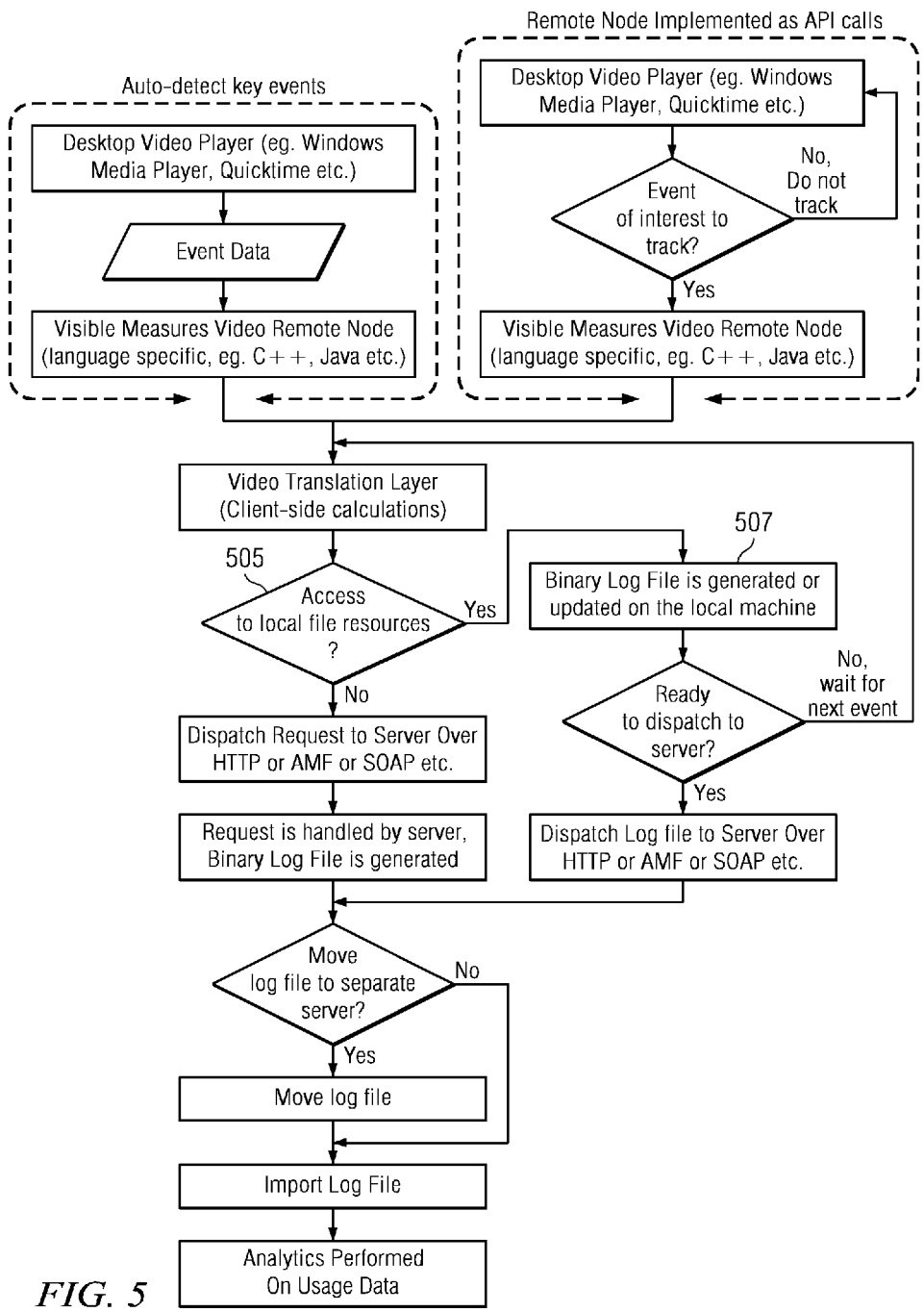
FIG. 5 illustrates another embodiment of the video tracking method of FIG. 3 wherein local machines can store data.

FIG. 5 illustrates another embodiment of the video and rich media measurement technique. This embodiment is similar to that of FIG. 4 but illustrates the scenario where the end user's machine can store the event data locally. This functionality is represented in the drawing as the test at step 505, which determines whether there are local file resources in which the event data can be stored. If there are local file resources, the binary log file is generated or updated on the local machine as indicated by step 507. The remaining steps are similar to those described above with respect to FIG. 4.

In operation, an end user video player is instrumented to capture data. The data is collected by a service provider and made available for viewing by customers of the video experience measurement (VXM) service. A video player or rich media application collects a variety of data including the clip metadata, every click a user makes, and more. This information, and the associated metrics it produces, is grouped into one or more categories for organizational purposes. These categories encompass both core measures that are collected, as well as the set of metrics that are derived from the core metrics. The groupings may include the following:

Base measures: These are the most fundamental units, expressing key dimensions and counts.

Title/Clip and Player metrics: With each title view, metadata describing the clip is transmitted, similarly for information specific to the player. Therefore, a series of metrics used to define individual titles and video players are developed.

Portfolio performance and overall experience metrics: This set of metrics provides a sense of how an overall video portfolio is generally performing, and it includes metrics to describe aspects such as reach, frequency, and time spent.

Engagement and viewership metrics: Based on the movement of the video playhead, the system accounts for the number of times and duration that videos were played, replayed and "skipped." Additionally, these metrics describe how and when users watch titles (and collections of titles), as well as their level of interaction and time spent.

Virality and sharing metrics: This category of metrics provides insight into the way in which videos are referred, as well as distribution of titles and their spread among end users.

Base Measures

The following describes a desirable set of base measures. These are representative metrics that can be calculated based on the data collected by the video and rich media application tracking system.

A session (or player load) is an interaction, by an individual, with a video-enabled web site comprising of one or more requests for an analyst-definable unit of content (i.e. "title view"). The system preferably initiates a new end-user session when its tracking component is loaded, which occurs as part of the loading of the video player. A session occurs regardless of whether a video is ever viewed and may consist of one or more title views. If a user does not have any activity (i.e., calls made by the instrumented player) in a session for a given time (e.g., 30 minutes), the session is deemed to have expired and resets on a next event. There may be multiple concurrent sessions if a user is viewing videos instrumented for separate accounts. Further, one session may track videos on different web sites (for the same account).

A video session is a session where there is at least one "view" event. Sessions preferably are based on a first trackable event (e.g. a player load); thus, the Total Sessions>=Total Video Sessions. Player loads represent a potential number, where "video session" is an actual number.

A unique visitor is the distinct number of inferred individual people within a designated reporting timeframe, with activity consisting of one or more sessions. Each individual is counted only once in the unique visitor measure for the reporting period. Authentication, either active or passive, is an accurate way to track unique visitors. Because most sites do not require a user login, however, an individual may be deemed to be a unique visitor based on the ID stored in a Flash Shared Object (analogous to a traditional browser cookie) embedded into a video player. Unique IDs are maintained across the entire set of players. Preferably, a unique visitor count is associated with a time period (day, month, and all-time), and it is a "non-additive" metric. This means that unique visitors are not added together over time, over title views, or over groups of content, because one visitor can view multiple titles or have multiple sessions in the time frame studied. A new visitor metric is a number of unique visitors with activity for their first-ever session during a reporting period. A repeat visitor metric is a number of unique visitors with activity consisting of two or more sessions to a site during a reporting period.

A unique viewer is a unique visitor where there is at least one "view" event. Thus, whereas unique visitors are based on Sessions, unique viewers are based on video sessions; therefore Total Unique Visitors>=Total Unique Viewers.

A title (also known as a clip or video) is an analyst-definable unit of content.

A view is classified as a definable request for a video clip/title, triggered by a "view clip" event. These events occur when the end-user does any of the following: 1) first time a play button is pushed on a new clip; 2) clicks the "next clip" button and then the "previous clip" button; or 3) closes and reopens the player. If the user scrubs (i.e. rewinds) to the beginning of the clip and replays it, only the initial view clip event is registered, and if the user watches a title all the way through and clicks the play button again, a new view clip event is not triggered. A unique view metric is a number of initial views from unique visitors during a reporting period—i.e. the first time a title was ever viewed by a visitor in a reporting period. Typically, the number of unique views for a title is equal to the unique visitors who have viewed that title during a reporting period. A repeat view metric identifies the subsequent views by unique visitors (their second view and additional ones) during a reporting period. A total views metric is a sum of all types of views, therefore Total Views=Unique Views+Repeat Views.

Title/Clip Player Metrics

The platform may collect metrics and metadata used to describe the state of titles and players. Player-specific information may include, for example, player identifier, a player tag, player dimensions, player default behaviors, and the like. Title-specific information may include, for example, metadata describing the contents of the Title asset (e.g., Clip ID, Title, description, tags, and category), metadata describing the Title's video file attributes (e.g., thumbnail URL, video source file URL, duration, and the like), metadata describing the customer's business relationship to the asset (e.g., business unit, creator, and the like), and other data (e.g., the number of days since the first view clip event was tracked by the player).

Portfolio Performance and Trending Metrics

These metrics are used to describe the overall health of a portfolio and to help a customer gauge emerging patterns. The metrics include, for example, average title views per session (total title views divided by total video sessions), average title views per viewer (total title view divided by total unique viewers), average viewing time per session (captive viewing time divided by total view sessions), average viewing time per viewer (captive viewing time divided by total unique viewers), total distinct titles viewed, total view sessions per viewer (total video sessions divided by total unique viewers), and the like.

Viewership and Engagement Metrics

These are metrics that quantify the viewing experience "outside" and "inside" of a video asset. As noted above, a typical video asset is a video clip or "title." Preferably, each title is divided into a number (e.g., 10) equal segments (e.g., and thus 10% increments), where each of these segment boundaries are then marked by "crossing points" or "beacons." Beacons are used to mark entry into segments of an individual title's video timeline. Preferably, there are segment beacons at the beginning and end of a title and, in a representative embodiment, at each tenth of the duration of the title. For example, for a 100 second title and 10% increments, there are beacons at the 0, 10, 20, . . . , 90, and 100 second marks. Of course, the above-described number of segments and segment percentages are merely illustrative, as any number of segments may be used. Whenever the playhead of the media player crosses over into a segment, a Segment View is incremented for that clip. The number of segment views can be larger than the number of title views for the title because of the end user's ability to rewind and fast forward (sometimes referred to as scrubbing). If a title plays all the way to the end, and the play button is pressed again before any other title is chosen, the play will begin at beacon 0 but preferably this will not be recorded as another view. The initial beacon is not tracked until the view is played from the beginning. If the player is loaded and the title is never played or auto-played, the initial beacon is not considered to be viewed.

An initial attention metric quantifies the decrease (or in rare cases the increase) in viewership of a first % (e.g., 10%) of the video timeline. Thus, the initial attention is a % difference between the views at segment 0 to those at segment 1. Initial attention quantifies the % difference between segment 0 views and segment 1 views (drop off in the first 10%). Preferably, this metric is calculated by (Segment1Views−Segment0Views)/(Segment0Views).

A strong impression zone metric is a metric that identifies peaks or "hot spots" in the engagement report, and this metric indicates the popular points in a video that users tend to replay.

A weak impression zone metric is a metric that identifies "troughs" or "cold spots" in the engagement curve, indicating the low popularity points in a video that users tend to skip over.

An interest level metric is a metric determined by ordering the largest "hot spots" or strong impression zones, over a set of clips.

A playthrough rate metric measures the proportion of viewers who start a video playback and continue uninterrupted relative to a point of interest (e.g. the end, a middle portion, or the like). A playback is considered interrupted, for example, by scrub events, pausing or stopping, or by closing the browser. Like segment boundaries, preferably playthroughs are measured at predetermined (e.g., 10%) increments of the video timeline.

An abandonment rate metric measures the proportion of viewers who abandon the uninterrupted video playback at a certain beacon point. Abandonment rate is the compliment of playthrough rate.

A stickiness metric represents a number of repeat views/total views of a specific title.

A captive viewing time (CVT) metric represents how much "eyeball time" or "brand exposure" a title or rich media application receives. This measure can be aggregated across titles, users, and time periods. Captive viewing time is calculated by taking the area under an engagement curve, defined below. In one embodiment, this metric is an estimate of the time spent by all viewers computed by multiplying the total number of segment views times the duration divided by the number of segments. Thus, CVT=Sum for each segment of the number of views for the segment*segment time slice in seconds.

A viewability metric is a measure of the yield or "return" on the content and may be calculated as the ratio of total captive viewing time to the content duration. Thus, Viewability=CVT/Duration.

An engagement index metric describes to what extent audiences watch, interact, and replay portions of the video, as well as the intensity of the interaction with that video or piece of rich media content. Preferably, the engagement index is a normalization of captive viewing time, allowing the captive viewing time of one clip to be relatively compared with that of others. Thus, for example, the index may be calculated as follows: CVT for this Title/standard potential CVT for this Title. The system may benchmark the peak of the engagement curve (the highest number of views for any segment) as 100% as the total y-axis, and the number of segments as the total x-axis—thus total possible CVT is the area of this square. Thus, to find the engagement index, the system takes an area under the curve divided by the area of the square. Another way to calculate this index is to take the total number of Segment Views divided by ((maximum number of segment views for a segment for that title) times the number of segments)).

An interaction intensity metric combines the various dimensions of usage such as the number of clicks, comments, ratings, time on site (session time), and repeat viewership/stickiness.

A captivation index is a measure of the level of interest in a piece of video or rich media content. It essentially is a mathematical representation of the "hot spots" of a video as shown on a video heat map (see, e.g., FIG. 16 below). The point at which the curve shows a crest represents the point of highest interest in the video. Videos or pieces of rich media content with higher captivation indices will have more of a "hot spot" shaped heat map as they have more of a defined peak interest point or event.

An engagement type metric classifies the overall engagement curve pattern, which relates to the type of viewing experience. For instance, engagement curves can generally be "steady," "falling," "rising," "peak centered" or "jagged."

Virality Metrics

These metrics describe distribution and spread of the video clips. The following are representative.

A title reach metric represents how many viewers in a "target population" saw this title. The system defines this target population as the total number of people who have watched any of the customer's videos. Therefore, title reach=total unique views for the video/total number of unique users for a given customer portfolio*100%.

A popularity metric is a ratio of a clip's audience to the total audience, within a defined set.

A referral metric defines the various methods that are used to share, or spread, videos; in this measure, the number of times each method was used is counted.

A domain metric identifies the domain from which the clip was viewed.

A placement metric defines the unique instances of a title. Affiliate placements are the unique instances on a given affiliate. A unique instance factor is determined by a placement ID that is assigned by the video site/platform when the title is initially seeded on a site and made available for sharing, or when it is it shared from site to site. Placements may be grouped by affiliate to segment and identify distribution and spread patterns. Overall placements is a metric describing the number of unique instances of the title overall.

A virality metric measures how fast a video a video increases its reach. This is measured by the rate of change in unique views over time. A community virality metric is the virality within a specific user community.

An affiliate links metric identifies where the title was and where it is, and how it got there. This metric enables the system to track and analyze the path that the content has traveled. It tells the user which affiliates are spreading a title, and which affiliates are spreading a title into specific affiliates of interest.

A spread metric is measure of the "distance" a video clip traveled. Preferably, this distance is defined as a function of the number of users who consumed a clip and the number of communities (or hosts) it has reached. Other spread metric functions may be implemented as well.

A velocity metric is a measure of spread over a unit time.

A momentum metric quantifies the "velocity" at which a clip is gaining/losing consumption.

An impact metric quantifies the rate of change (i.e. velocity) in momentum over time, or the "acceleration" of video consumption.

A consumption metric combines the measures of engagement and virality, preferably as follows: consumption=engagement*virality, where engagement is a measure indicating how much audiences watch, interact, re-watch, and share a video and virality is a measure of how fast a video "spreads" around the web, e.g., from person-to-person, and community-to-community.

The system may also generate other types of metrics, such as the following:

Advertising information: When advertising units are displayed, a number of events can be triggered relating to the timing of the ad placement as well as information about the ad itself (including ID, model, duration, title, and description). This set of metrics accounts for these advertising-related events.

Audience characteristics: Metrics that explain the makeup of the general audience in terms of their demographics, technical profile and geo-location.

User Interactions: Another series of metrics are developed around user behavior with the various controls on the player. These can include such features as: "embed" or sharing links, different clicks, player expansion, player minimization, audio controls/mute, and the like.

Figure 6:
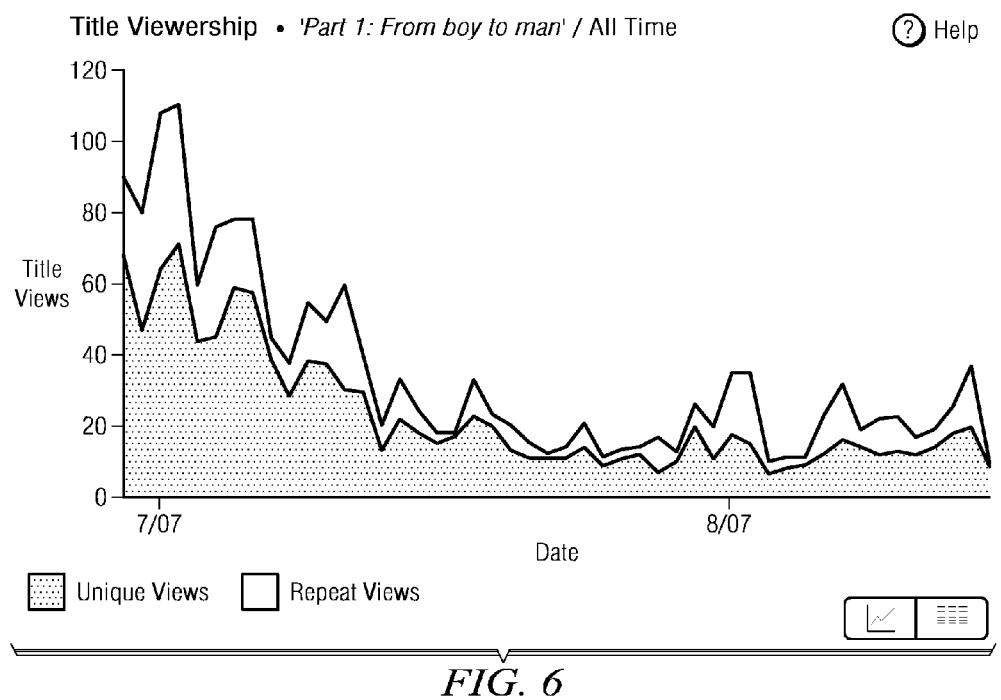
FIG. 6 is a representative total viewership graph that displays a trend of unique and repeat viewers over time.
Figure 7:
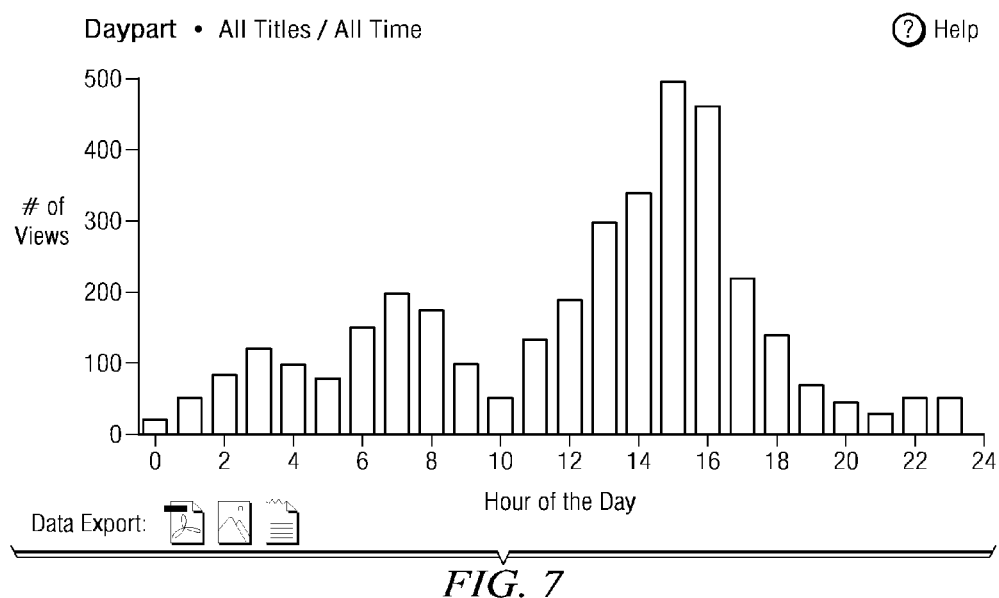
FIG. 7 is a representative daily view graph that illustrates an hourly breakdown of views for a particular clip.
Figure 8:
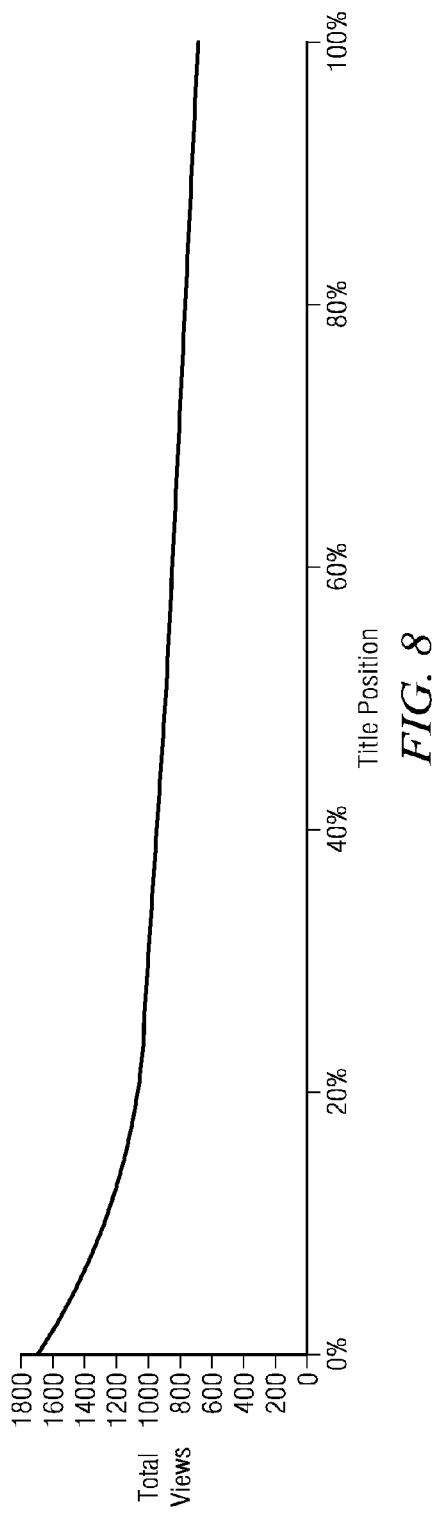
FIG. 8 illustrates an engagement graph that plots total views over position within a given clip.
Figure 9:
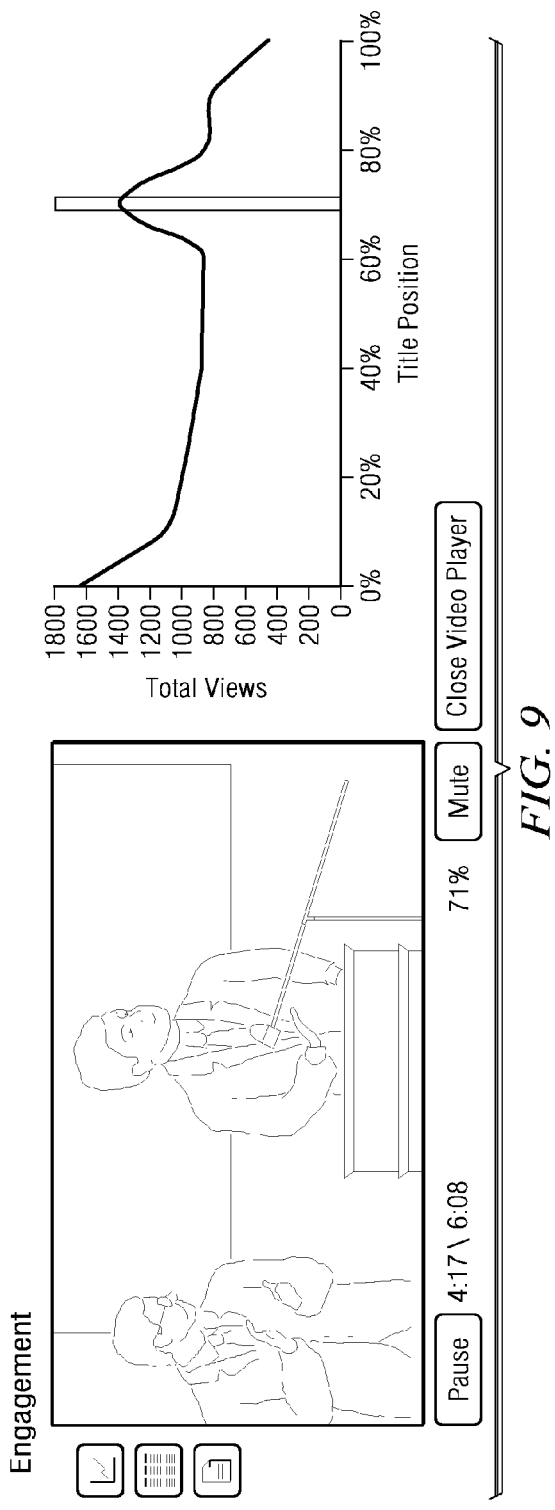
FIG. 9 illustrates a video and a hotspot graph.
Figure 10:
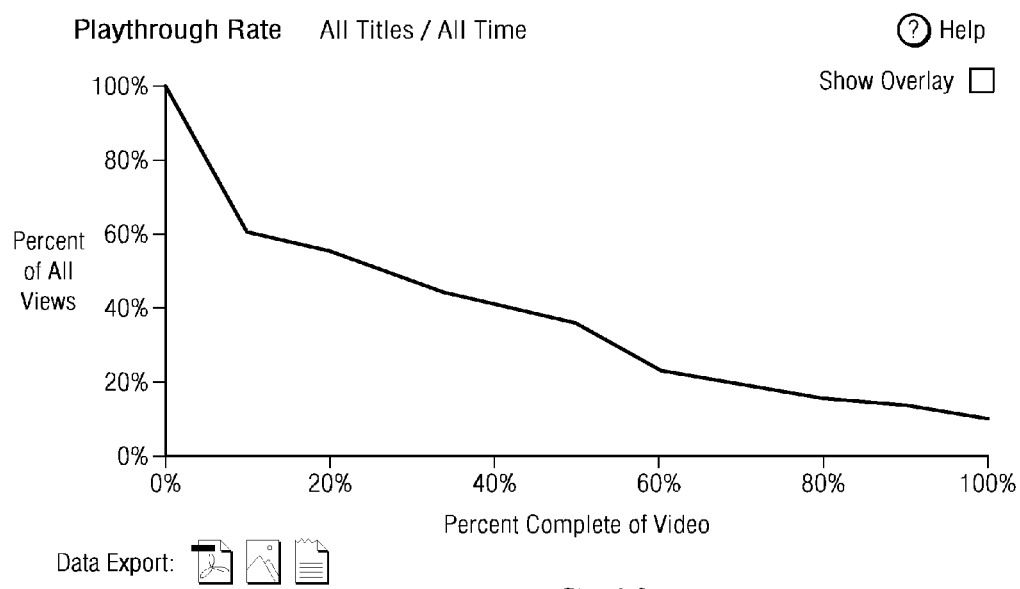
FIG. 10 illustrates a graph of playthrough rate, which plots percent of all views against percent completion values.
Figure 11:
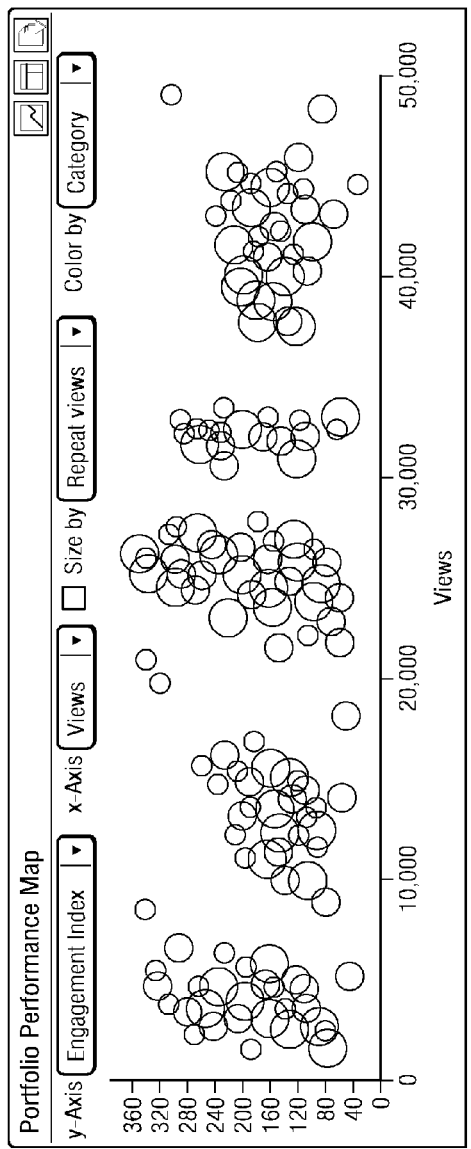
FIG. 11 illustrates a scatter plot by which a user can compare any pair of metrics (e.g., views, repeat views, engagement index, reach, frequency, viewing time, duration, stickiness, initial attention, and so forth) that are identified and selected by pull-down menus.
Figure 12:
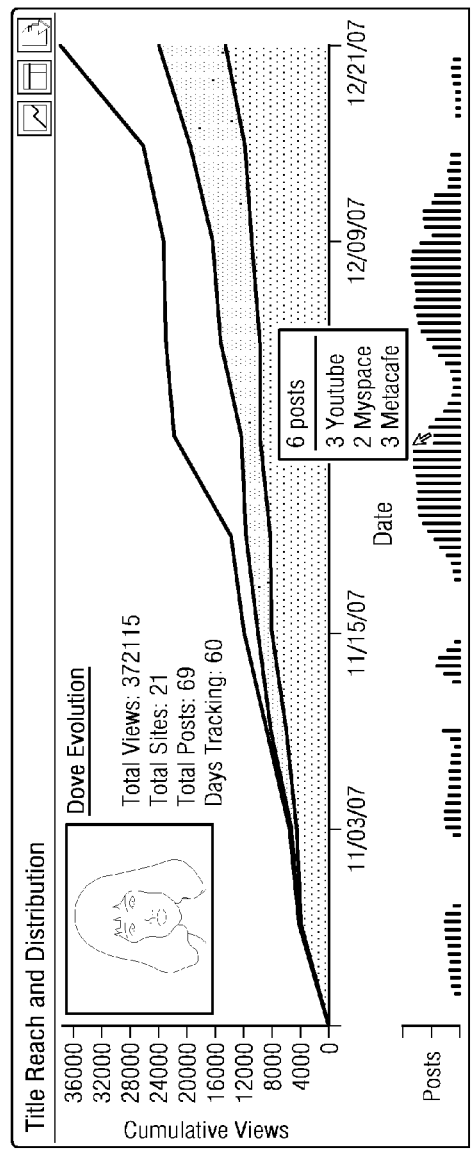
FIG. 12 illustrates a title reach and distribution graph that plots cumulative views over time.
Figure 13:
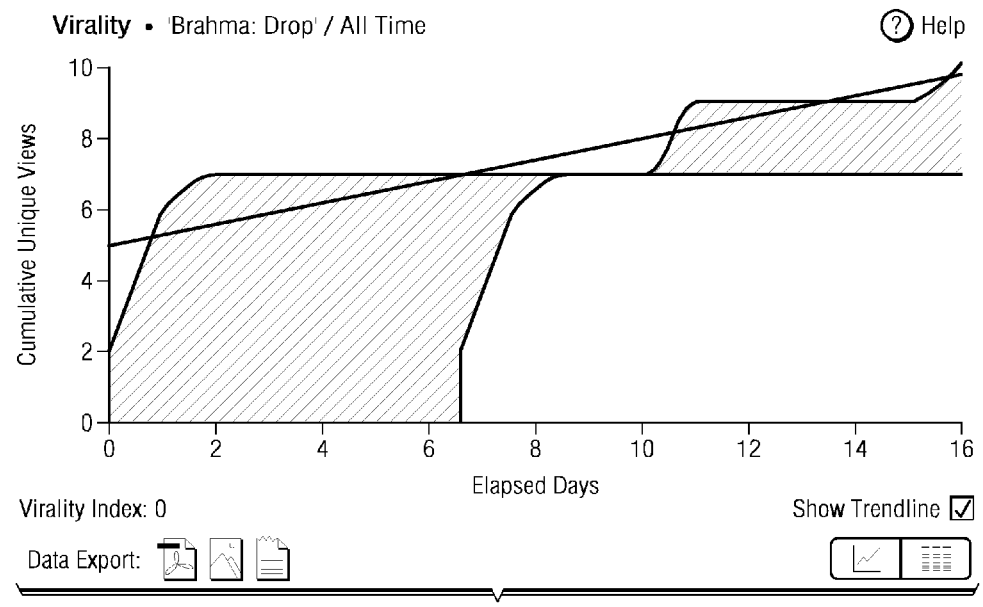
FIG. 13 illustrates a virality graph showing a cumulative number of views of a clip plotted against time.
Figure 14:
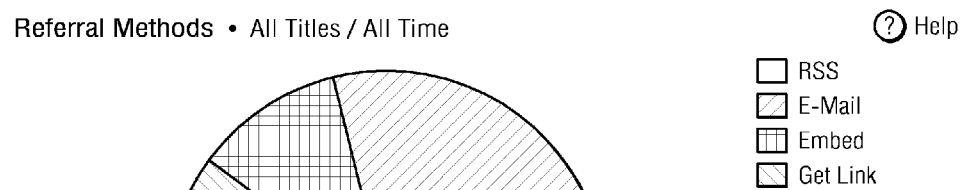
FIG. 14 illustrates a referral pie chart, which shows how end users share the video.
Figure 15:
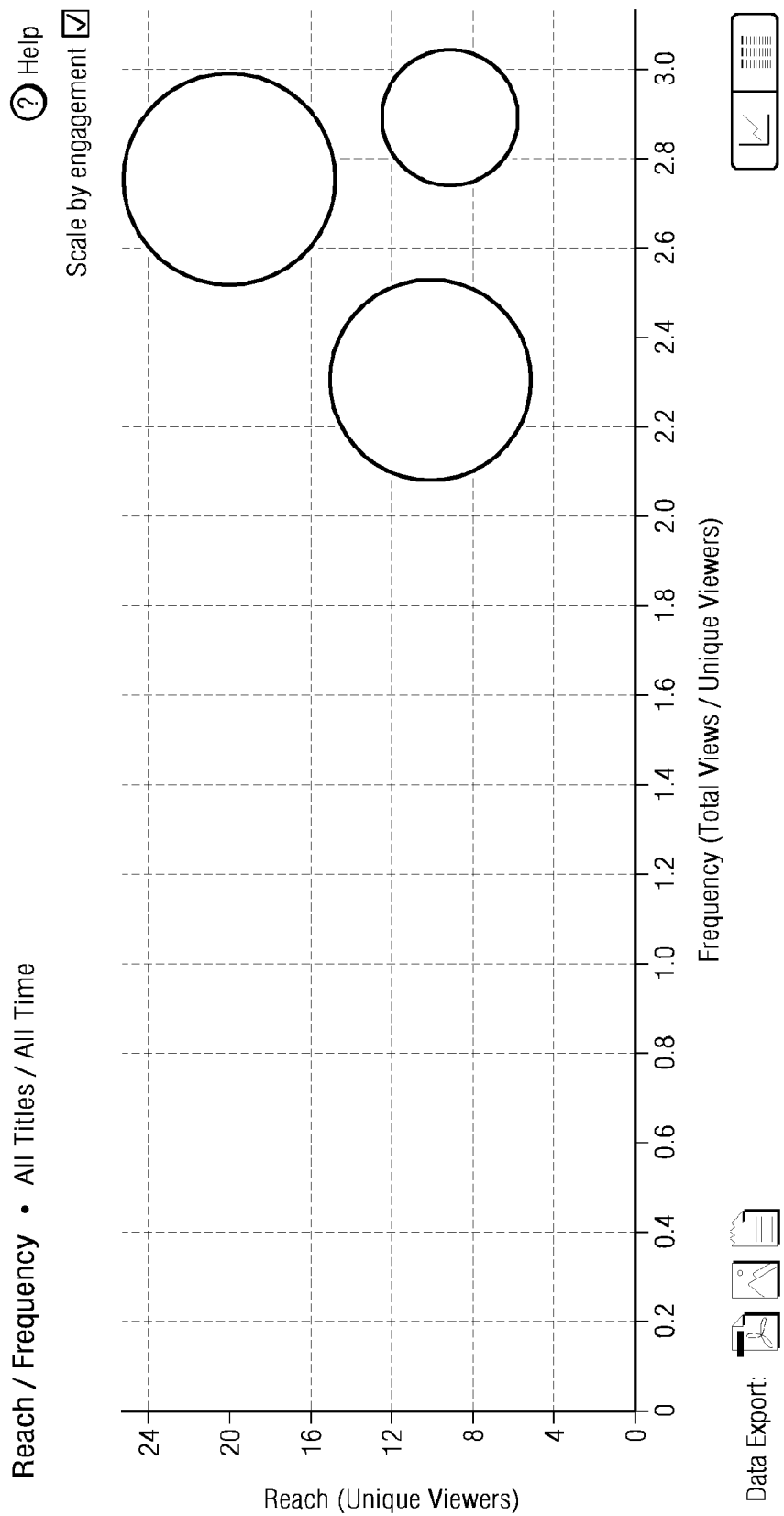
FIG. 15 illustrates a graph that plots reach (unique viewers) versus frequency (total views divided by number of unique viewers)
Figure 16:
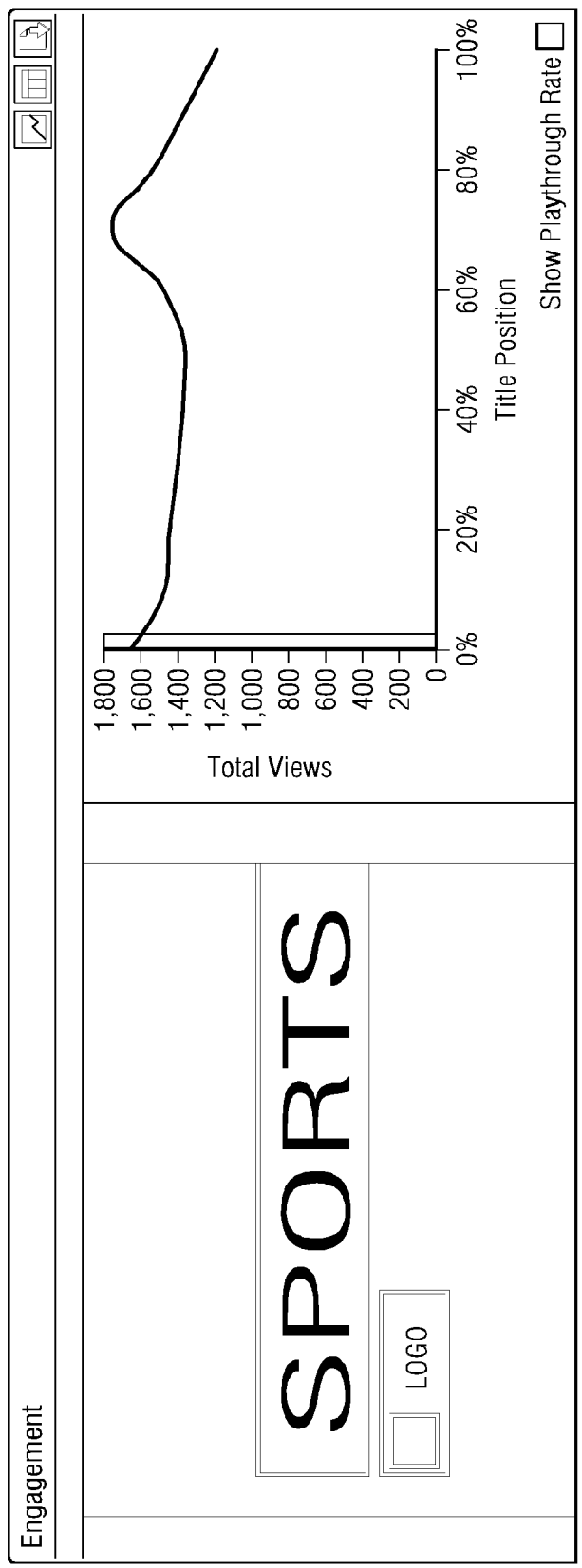
FIG. 16 illustrates an engagement graph with a crest (a peak) that represents a point of highest interest in the video.

The above-identified metrics may be visualized in any convenient manner. Thus, for example, FIG. 6 is a total viewership graph that displays a trend of unique and repeat viewers over time. FIG. 7 illustrates a daypart graph that illustrates an hourly breakdown of views for a particular clip. This graph enables the user to better understand time of day viewing habits. FIG. 8 illustrates an engagement graph that plots total views over position within a given clip. This graph conveys viewership changes over the video timeline. FIG. 9 illustrates how hot spots can be identified. In this display, the video is playing on the left while the customer can see the level of engagement on the right; the vertical bar indicates progress through the video as it is playing. The most popular portions of the video can then be identified to create a "heat map" for the clip. The heat map typically identifies the most popular portions or segments of the clip (or a set of clips). FIG. 10 illustrates a graph of playthrough rate, which plots percent of all views against percent completion values. Playthrough is similar to engagement but ignores activity after any user interaction (e.g., moving a slider). FIG. 11 illustrates a scatter plot by which a user can compare any pair of metrics (e.g., views, repeat views, engagement index, reach, frequency, viewing time, duration, stickiness, initial attention, and so forth) that are identified and selected by pull-down menus. The size of a "bubble" represents the number of users who fall into a point on the graph. FIG. 12 illustrates a title reach and distribution graph that plots cumulative views over time. The stacked lines show the number of views for three portals, and the bar chart at the bottom shows the number of posts of the video per day. FIG. 13 illustrates a virality graph showing a cumulative number of views of a clip plotted against time. FIG. 14 illustrates a referral pie chart, which shows how end users share the video. FIG. 15 illustrates a graph that plots reach (unique viewers) versus frequency (total views divided by number of unique viewers). By selecting a checkbox, the user can factor in engagement. FIG. 16 illustrates another example of an engagement graph, which includes a small crest (near the 70% mark) that represents a point of highest interest for this particular video (and end user base sample). As noted above, the system may generate a value (e.g., a captivation index) which reflects the hot spot of the video as shown on the video heat map. Of course, a particular video may have multiple hot spots as indicated by the collected data.

The above graphs and charts are exported to a user via the web portal, although the information may also be provided in any other convenient manner (e.g., reports, email, data feeds, as XML, or the like). The outputs are merely representative, as any of the above-identified metrics can be provided in any convenient graphical or other display/output format.

The following is a more detailed listing of the API methods for the remote node.

| Methods | |
|---|---|
| init( ) | Initalizes the remote node and enables further logging of events |
| playerLoaded( ) | Logs configuration info about the video player |
| clipRequested( ) | Logs a request made for a video clip |
| clipViewed( ) | Logs information about a clip that is being viewed |
| clipPlayed( ) | Begins logging of video viewing information |
| clipPaused( ) | Pauses logging of video viewing information |
| clipScrubbed( ) | Sets the position of the current clip after seeking |

| Methods | |
|---|---|
| adViewed( ) | Logs information about a advertisement that is being viewed |
| adPlayed( ) | Logs the start of playback of this ad |
| adPaused( ) | Logs the pausing of playback of this ad |
| adCompleted( ) | Logs the completion of an advertisement |
| logConnectionSpeed( ) | Logs a users connection speed |
| logPlay( ) | Logs the user execution of a play feature |
| logPause( ) | Logs the user execution of a pause feature |
| logScrubBegin( ) | Logs the user execution of a scrubbing feature |
| logScrubEnd( ) | Logs the end of a scrubbing feature |
| logMute( ) | Logs the user execution of a mute feature |
| logUnmute( ) | Logs the user execution of an unmute feature |
| logVolumeChange( ) | Logs the user execution of a volume change |
| logMaximizePlayer( ) | Logs the maximization of the player window |
| logRestorePlayer( ) | Logs the return of the player to a normal size from a maximized state |
| logReferRSS( ) | Logs a user RSS referral of the current clip |
| logReferEmail( ) | Logs a user email referral of the current clip |
| logReferEmbed( ) | Logs a user embed referral of the current clip |
| logReferLink( ) | Logs a user link referral of the current clip |
| logReferBlog( ) | Logs a user blog referral of the current clip |
| logPrevious( ) | Logs the user navigation to a previous clip in the lineup |
| logNext( ) | Logs the user navigation to the next clip in the lineup |
| logSearch( ) | Logs a user title search and its results |

Figure 17:
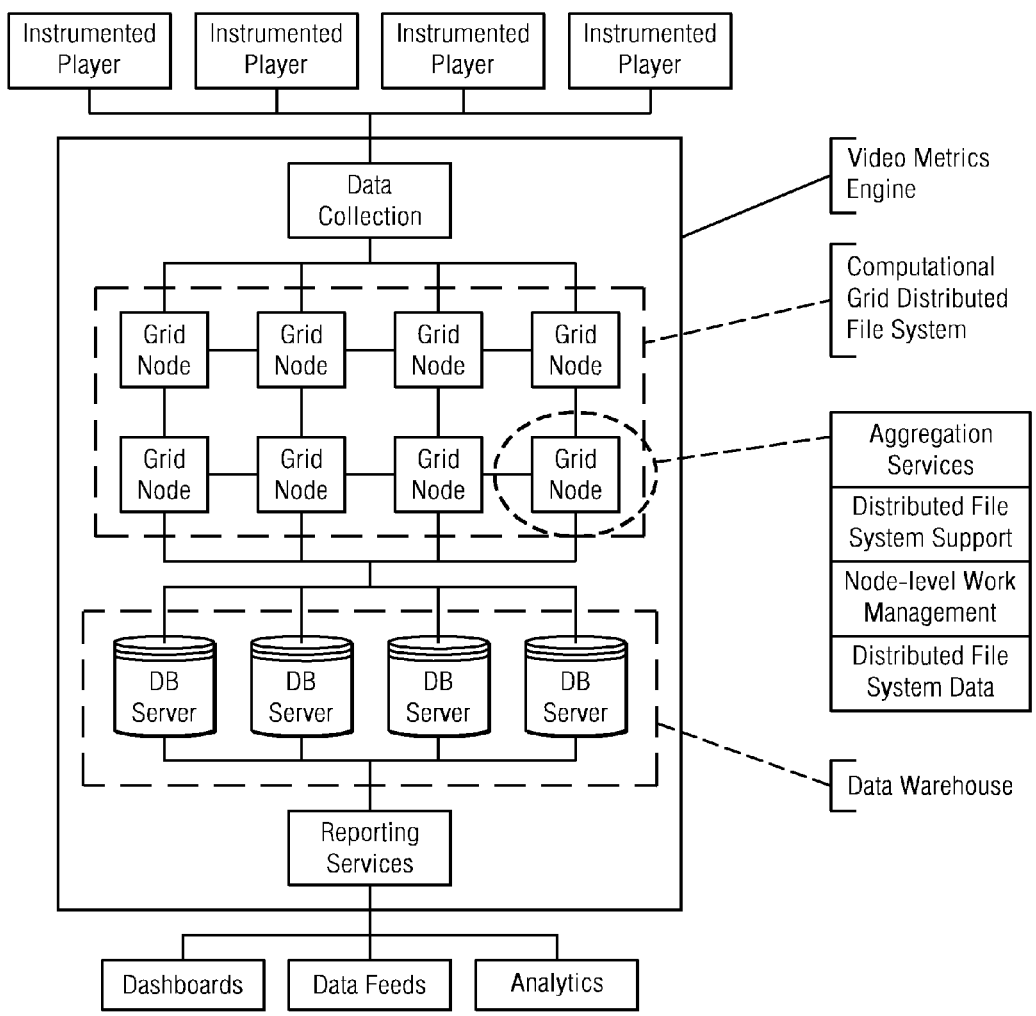
FIG. 17 illustrates a video/rich media metrics analytics service computation grid in which the techniques of this disclosure may be implemented.

FIG. 17 illustrates a computational grid in which the video metrics engine of the service may be implemented. The grid comprises a collection of grid nodes that may be located across one or more Internet data centers. These nodes comprise a distributed file system computational grid. A particular grid node (typically a server machine) comprises aggregation services, distributed file system support, and other node-level work management routines. The data generated by the grid is stored in a data warehouse layer comprising a set of database servers. The reporting services export the data to an output layer comprising dashboards, data feeds, and third party analytics engines.

As previously noted, the hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. As illustrated in FIG. 1, log server may be part of a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

The hosted service may be implemented in a multi-server cluster environment that is designed to scale efficiently. Each server is designated with a primary and secondary series of tasks. Preferably, one server is dynamically set to be a master server, which server determines the secondary tasks to be performed by all servers. All servers update their existence within a database, and the servers cooperate to determine which server will be the master. The servers in the cluster are assigned tasks (such as log import and event processing) by the master server.

Having described our invention, what we now claim is set forth below.

The invention claimed is:

1. An apparatus for measuring end user viewing experience with respect to an Internet Protocol (IP)-delivered video that comprises a set of segments, comprising:
   an Internet-accessible infrastructure operating at a service provider domain, the Internet-accessible infrastructure comprising at least one web server, an application server, and a database;
   the application server operative to receive and store in the database data generated as a result of end users each viewing and interacting with the video using a video player that receives and renders the video, wherein the data represents interaction events that are tracked at the video player on a segment-by-segment basis for each of the set of segments in the video, the interaction events representing end user interactivity with the video other than viewing of the video, the end user interactivity being one of: scrubbing, stopping, pausing, re-watching and abandoning, and wherein at least first and second end users view and interact with the video asynchronously from one another;
   the application server further operative to generate interaction data that associates the interaction events with a timeline of the video that includes at least some of the set of segments;
   the web server operative, following authentication by a permitted entity, to use at least some of the interaction data to display, in a set of one or more web pages, a visualization of end user viewer engagement with the video on a segment-by-segment basis.

2. The apparatus as described in claim 1 wherein the visualization represents a total number of views.

3. The apparatus as described in claim 1 wherein the visualization identifies a portion of the video that has a higher popularity as compared to other portions of the video.

4. The apparatus as described in claim 1 wherein the visualization identifies a portion of the video that has a lower popularity as compared to other portions of the video.

5. The apparatus as described in claim 1 wherein the visualization identifies a proportion of end users that initiate playback that is continued uninterrupted to a location in the timeline.

6. The apparatus as described in claim 1 wherein the visualization identifies a proportion of end users that abandon uninterrupted playback of the video at a location in the timeline.

7. The apparatus as described in claim 1 wherein the web server is further operative to display within a web page a hot spot metric that illustrates a portion of the video that has a higher popularity as compared to other portions of the video.

8. The apparatus as described in claim 1 wherein the web server is further operative to display within a web page a cold spot metric that illustrates a portion of the video that has a lower popularity as compared to other portions of the video.

9. The apparatus as described in claim 1 wherein the web server is further operative to display within a web page a playthrough rate that measures a proportion of end users that initiate playback that is continued uninterrupted to a given location associated with the video.

10. The apparatus as described in claim 1 wherein the web server is further operative to display within a web page an abandonment rate that measures a proportion of end users that abandon uninterrupted playback of the video at a certain segment.

11. The apparatus as described in claim 1 wherein the web server is further operative to display within a web page a number of repeat views divided by a number of total views for the video.

12. The apparatus as described in claim 1 wherein the web server is further operative to display within a web page a captive viewing time (CVT) for the video.

13. The apparatus as described in claim 1 wherein the web server is further operative to display within a web page a ratio of CVT divided by duration.

14. The apparatus as described in claim 1 wherein the web server is further operative to display within a web page a total unique views for the video/total number of unique users for a given customer portfolio*100%.

15. The apparatus as described in claim 1 wherein the previously presented web server is further operative to display within a web page a spread metric.

16. The apparatus as described in claim 1 wherein the web server is further operative to display within a web page a velocity metric that represents a measure of spread over a unit time.

17. The apparatus as described in claim 1 wherein the web server is further operative to display within a web page a momentum metric that quantifies a velocity at which the video is gaining or losing consumption.

18. An apparatus for measuring end user viewing experience with respect to an Internet Protocol (IP)-delivered video that comprises a set of segments, comprising:
an Internet-accessible infrastructure operating at a service provider domain, the Internet-accessible infrastructure comprising at least one web server, an application server, and a database;
the application server operative to receive and store in the database data generated as a result of end users each viewing and interacting with the video using a video player that receives and renders the video, wherein the data represents interaction events that are tracked at the video player on a segment-by-segment basis for each of the set of segments in the video, the interaction events representing end user interactivity with the video other than viewing of the video, the end user interactivity being one of: scrubbing, stopping, pausing, re-watching and abandoning, and wherein at least first and second end users view and interact with the video asynchronously from one another;
the application server further operative to generate interaction data that associates the interaction events with a timeline of the video that includes at least some of the set of segments;
the web server operative to generate and display a web page that includes the first portion in which the video is playable, and second portion juxtaposed adjacent the first portion and in which a display plot that associates the interaction data with a playhead position of the video is displayed;
wherein as the video is played in the first portion, a visual indicator is overlaid on the display plot indicating a then-current playhead position in the video, and
wherein juxtaposition in the web page of video playback, the display plot of interaction data, and the visual indicator provide visual feedback indicating engagement of end users with respect to the video at respective segments in the set of segments.

19. The apparatus as described in claim 18 wherein the web server is further operative to display within a web page an impact metric that quantifies a rate of change in momentum over time of video consumption.

20. The apparatus as described in claim 18 wherein the web server is further operative to display a web page that includes a metric that is a function of one of: (i) a captive viewing time, and (ii) a combination of captive viewing time and an intensity of an interaction with the creative.

21. An apparatus for video experience measurement, comprising:
a processor;
computer memory holding computer program instructions executed by the processor to:
receive data generated from a collection of video players, wherein each video player is instrumented to identify a set of interaction events as the video player renders a video and an end user interacts with the video player, wherein the video is broken into a set of segments so that the interaction events are tracked on a segment-by-segment basis; and
process the data for the video to generate a behavior metric, wherein the behavior metric is a captive viewing time (CVT) for the video that is a total number of segment views divided by ((maximum number of segment views for a segment) times the number of segments)).

* * * * *